US009683335B2

United States Patent
Schuurman et al.

(10) Patent No.: US 9,683,335 B2
(45) Date of Patent: Jun. 20, 2017

(54) DEVICE FOR INSERTING ARTIFICIAL GRASS STRANDS INTO THE GROUND

(71) Applicant: Sissgrass B.V., Amsterdam (NL)

(72) Inventors: Thomas Schuurman, Nederhorst den Berg (NL); George Mullan, Sligo (IE)

(73) Assignee: Sisgrass B.V., Amsterdam (NL)

( * ) Notice: Subject to any disclaimer, the term of this patent is extended or adjusted under 35 U.S.C. 154(b) by 105 days.

(21) Appl. No.: 14/842,354

(22) Filed: Sep. 1, 2015

(65) Prior Publication Data

US 2016/0215457 A1    Jul. 28, 2016

(30) Foreign Application Priority Data

Jan. 26, 2015    (NL) .................................. 2014189

(51) Int. Cl.
  *E01C 13/08*    (2006.01)
  *D05C 15/18*    (2006.01)
  *A01C 11/00*    (2006.01)

(52) U.S. Cl.
  CPC .............. *E01C 13/08* (2013.01); *A01C 11/00* (2013.01); *D05C 15/18* (2013.01); *E01C 2013/086* (2013.01)

(58) Field of Classification Search
  USPC ........ 111/200, 900–902, 919, 918, 100–106; 414/911; 428/17
  See application file for complete search history.

(56) References Cited

U.S. PATENT DOCUMENTS

| 3,515,079 A | * | 6/1970 | Ware, Jr | A01C 11/00 111/104 |
| 5,481,991 A | * | 1/1996 | Geerts | E01C 13/08 111/200 |
| 6,938,565 B2 | * | 9/2005 | Geerts | D05C 15/08 112/80.57 |

FOREIGN PATENT DOCUMENTS

| EP | 1384817 A1 | 1/2004 | |
| NL | 1007279 C2 * | 4/1999 | ............ E01C 13/08 |
| WO | 93/08332 A1 | 4/1993 | |
| WO | 01/79611 A1 | 10/2001 | |

OTHER PUBLICATIONS

Oct. 6, 2016—(EP) Notice of Allowance—App: 15 181 163.5.
Sep. 17, 2015—(NL) Search Report—App 2014189.

* cited by examiner

*Primary Examiner* — Alicia Torres

(74) *Attorney, Agent, or Firm* — Banner & Witcoff, Ltd.

(57) ABSTRACT

A device for inserting artificial grass strand parts in the ground comprises at least one drum mounted on a frame for rotation about a substantially horizontal axis. The drum receives a plurality of artificial grass strands unwound from a plurality of spools. The drum comprises a plurality of clamps which hold an artificial grass strand part between a front clamp and a rear clamp, viewed in the direction of rotation, which allow the artificial grass strand parts to rotate with the drum. At least one cutting device cuts the clamped artificial grass strand parts from the rest of the respective artificial grass strands. The drum rotates the series of artificial grass strand parts to below an insertion device which inserts the artificial grass strand parts into the ground.

15 Claims, 10 Drawing Sheets

US 9,683,335 B2

DEVICE FOR INSERTING ARTIFICIAL GRASS STRANDS INTO THE GROUND

FIELD OF THE INVENTION

The present invention relates to the creation of hybrid grass surfaces, wherein natural grass and artificial grass are mixed.

BACKGROUND OF THE INVENTION

Hybrid grass pitches are known and have been used for some years. A significant number of hybrid grass pitches has now been laid. One well-known example is the grass pitch of Wembley Stadium in London. A hybrid grass pitch has various advantages over a natural grass pitch, and also various advantages over a fully artificial grass pitch.

One advantage of a hybrid grass surface over a natural grass surface is that the durability is greater. Up to twice as many hours of sport per year can be played on a hybrid grass pitch as on a natural grass pitch.

Another advantage over natural grass is that the grass pitch remains green at all times. In addition, less pollen are released on use. The artificial grass strands effectively act as reinforcement to the ground and retain the pollen in their location.

A further associated advantage is that the surface is stiffer and can better resist impact and can be used more easily for other activities such as a concert. This is because the roots of the grass strands grow through the artificial grass strands. In addition, a hybrid grass surface drains better because the injected artificial grass strands form vertical drainage channels.

An advantage of a hybrid surface over a fully artificial grass surface is that the majority of the grass strands are natural, including the associated properties which are relevant for walking, running and rolling a ball. Also, the fragrance of a hybrid grass pitch is the same as that of a natural grass pitch.

Previously, machines for creating hybrid grass pitches were developed and produced by the company Desseaux (now written as Desso). One such machine is described in WO2001/79611A1. In this machine, the artificial grass strands are carried by compressed air to below an insertion device.

EP1384817 describes another machine for creating hybrid grass surfaces. In this machine, a single artificial grass strand is wound in a helical pattern around a drum. Then the single strand is cut into a plurality of strands by means of a cutting device. The strands are then inserted in the ground with an insertion device.

The company Desso has also developed another machine for creating hybrid grass pitches, which has also been brought into use.

The present invention is based on the insight that the known machines are quite slow due to their design. In addition, the known machines are not fully reliable in the sense that the insertion of a significant proportion of the artificial grass strands fails, and this leads to wastage.

OBJECT OF THE INVENTION

It is an object of the invention to create a device which allows a relatively rapid and reliable creation of a hybrid grass pitch.

It is an object of the invention to create a device which has fewer failures during insertion.

It is a further object of the invention to create a variant to the prior art.

THE INVENTION

In order to achieve at least one object, the invention provides a device for inserting artificial grass strand parts in the ground, the device comprising:
- a frame which is configured to support the various parts of the device,
- a plurality of spools with artificial grass strands wound thereon,
- at least one drum which is mounted rotatably on the frame and rotates about a substantially horizontal rotation axis, wherein the drum is configured to receive a plurality of artificial grass strands which are unwound from the spools and to rotate these artificial grass strands with the movement of the drum, wherein the drum comprises a plurality of clamps which, when viewed in side view, are arranged around the rotation axis, wherein the clamps rotate with the drum, wherein the clamps are configured to hold an artificial grass strand part of each artificial grass strand clamped between a front clamp and a rear clamp, viewed in the direction of rotation, and to cause the artificial grass strand parts to rotate with the drum,
- at least one cutting device for cutting through the artificial grass strands, so that the clamped artificial grass strand parts are cut off from the rest of the respective artificial grass strands,
- at least one insertion device which comprises a plurality of insertion pins and at least one actuator, wherein the actuator inserts the insertion pins into the ground over a depth, wherein the drum is configured to rotate the series of artificial grass strand parts to below the insertion device, wherein the insertion device is configured to insert the artificial grass strand parts which have been rotated to below the insertion device into the ground.

The rotating motion of the artificial grass strand parts allows a faster and more reliable insertion operation of the artificial grass strand parts. This rotating motion stands in contrast to said machine by Desso which has been brought into use, wherein the clamps with which the artificial grass strands are brought below the insertion device perform a reciprocating motion.

In the machine which has been brought into use by Desso, the strand must be gripped afresh each time. This is because, after inserting a strand, the clamp must be moved again to a free end of a new strand to be inserted in order to grip this and pull it out to below the insertion mechanism. This is carried out with a reciprocating motion. It has been found in practice that the gripping is not truly reliable. Gripping fails in up to 5% of cases, whereby fewer strands are inserted than is intended. This cannot simply be corrected because a large number of strands (for example 80) are inserted next to each other at the same time. It is not feasible to re-insert later in the 5% open sites.

In the present invention, the artificial grass strand to be inserted is held continuously via the rotating drum during the movement to below the insertion device. There is no need to grip a front end of the artificial grass strand again each time with the associated unreliability.

In the machine according to WO2001/79611A1, the artificial grass strands are blown through tubes and brought to below the insertion device using compressed air. This too is a relatively unreliable method.

In the machine according to EP1384817, a single strand is wound in a helical pattern around a drum. Then the single strand is cut into a plurality of strand parts by a knife. Then the strands are inserted in the ground by an insertion device. This is a very slow method because the single strand must be wound around the drum a very large number of times. This takes a very long time.

An advantage of the present invention in relation to the machine according to EP1384817 is that a hybrid grass pitch can be created more quickly. Because a plurality of strands are wound around a drum at the same time, work can proceed much more quickly. The cycle time is hence significantly shorter.

In an embodiment, during operation the device performs a cycle, wherein the cycle comprises a rotation period and a stationary period, wherein:
in the rotation period, the drum is rotated through a cycle angle ($\beta$), wherein a series of artificial grass strand parts is positioned below the insertion device and a new series of artificial grass strand parts is clamped, and
in the stationary period, the front series of artificial grass strand parts is released by the clamps and inserted in the ground by the insertion device.

In an embodiment, viewed in side view, the drum has 4, 5, 6, 7 or 8 clamps. It has been found that these are practical numbers.

In an embodiment—viewed in side view and measured along the path which is defined by the clamps and any guides—the clamps are placed at mutual intervals of 30 to 50 cm apart, in particular 35-45 cm apart, more particularly at intervals of 38-42 cm apart.

In an embodiment, an artificial grass strand part is held firmly by the front and rear clamp, viewed in the rotation direction, and the front clamp (viewed in the rotation direction) is moved underneath the insertion device due to the rotation of the drum.

In an embodiment, the insertion pins of the insertion device make contact with the artificial grass strands to be inserted on the underside of the drum.

In an embodiment, the distance (L1) between successive clamps—measured along the path defined by the clamps and any guides—corresponds to the length of the artificial grass strands to be inserted. The distances L1 are equal to each other and in side view define the angles of a regular polygon.

In an embodiment, the insertion pins are located in the drum. This results in a compact machine.

In an embodiment, the drum is configured to keep a stock of at least one series of cut artificial grass strand parts. It has been found, surprisingly, that this benefits the general reliability of the process.

In an embodiment, strand guides are positioned between the clamps, wherein the strand guides are mounted on the drum and rotate with the drum. The strand guides ensure a fixed position of the artificial grass strands.

In an embodiment, the cutting device is mounted in a stationary manner on the frame and is configured to cut through the series of artificial grass strands.

In an embodiment, the artificial grass strands are positioned in a row next to each other and rotate with the drum.

In an embodiment, each clamp is configured to hold at least 50 artificial grass strands, and for this the clamp has at least the same number of clamp shoes.

In an embodiment, a drum inlet where the artificial grass strands are supplied to the drum is on the top half of the drum, more particularly at an angle ca of 120-270 degrees from the lowest point of the drum. In this way, viewed in side view, the steps of clamping, cutting and insertion have a practical position.

The cutting device is located along the periphery between the location where the artificial grass strands are clamped and the location where the artificial grass strands are inserted.

In an embodiment, each clamp is configured to hold at least 50 artificial grass strands, more particularly at least 80 artificial grass strands.

In an embodiment, each clamp defines at least 50 parallel tracks, more particularly at least 80 parallel tracks, wherein the tracks lie next to each other and are separated from each other, wherein an artificial grass strand is guided into each track and wherein the clamp for each track comprises a clamp shoe for clamping the artificial grass strand in the track.

In an embodiment, each clamp comprises a series of front shoes and a series of rear shoes, in particular one front shoe and one rear shoe for each of the at least fifty tracks, wherein a gap is defined between the front shoes and the rear shoes, wherein the cutting device is configured to make a cut through the artificial grass strands in the gap so that the front shoes hold the rear ends of the cut artificial grass strand parts and the rear shoes hold the front ends of the artificial grass strands.

In an embodiment, the cutting device is configured to cut through the artificial grass strands in the stationary period.

In an embodiment, the clamps are pre-tensioned by means of a spring force element, wherein the artificial grass strands are automatically clamped when placed in the clamp without further action being required for this, and wherein the device comprises a clamp actuator which deactivates the two clamps, which hold the artificial grass strand part to be inserted below the insertion device, prior to insertion of the artificial grass strand parts by the insertion device.

In an embodiment, the clamp actuators are arranged in a stationary manner and mounted on the frame, in particular next to the drum.

In an embodiment, the device comprises a front drum and a rear drum which are placed behind each other in order to be able to work with two drums simultaneously.

In an embodiment, the device comprises wheels, tracks or skid elements to be able to move forward over the ground, or the device has a connector for attachment to a travelling vehicle, in particular a tractor, to be able to move the device over the ground.

In an embodiment, the device has a central driving part, wherein the front drum is positioned in front of the central driving part and the rear drum behind the central travelling part.

In an embodiment, the device has two groups of spools, a front group which is associated with the front drum and a rear group associated with the rear drum.

In an embodiment, the device comprises a presser element and a presser actuator, wherein the artificial grass strands are guided below the presser element, wherein the presser element has through-holes through which the insertion pins are inserted in the ground, and wherein in the stationary period, the presser actuator presses the presser element onto the ground and thus prevents a sideways movement of the artificial grass strands.

In an embodiment, the presser element defines grooves for the artificial grass strand parts so that the artificial grass strand parts can slide relative to the presser element, and wherein each through hole for an insertion pin opens into a groove.

In an embodiment, during use the clamped artificial grass strand parts are rotated successively below the insertion device.

In an embodiment, the clamps perform a rotating motion around the insertion device. In an embodiment, the clamps do not perform a reciprocating motion.

In an embodiment, the underside of the drum is at a distance of 5-30 cm, in particular at a distance of 10-20 cm above the ground.

In an embodiment, the drum has a diameter which is between 60 cm and 150 cm.

In an embodiment, the rotation axis of the drum lies substantially perpendicular to the movement direction.

In an embodiment, the cutting device is positioned at a distance from the insertion device which is greater than the distance between two successive clamps, so that the artificial grass strands are cut before they are positioned below the insertion device.

In an embodiment, the device has a cycle time of less than 8 seconds, in particular less than 6 seconds.

In an embodiment, a distance between the front drum and the rear drum can be adjusted by adjustment means.

The present invention also relates to a method for inserting artificial grass strand parts in a ground, the method comprising:
providing a device according to any of the preceding claims,
moving the device forward over the ground to a location and stopping the device at this location,
bringing of a series of artificial grass strand parts to below the insertion device by rotation by means of the drum, wherein the series of artificial grass strand parts is clamped between a front clamp and a rear clamp, viewed in side view and in relation to the rotation direction of the drum,
stopping the drum, and
inserting the artificial grass strand parts into the ground by the insertion device.

The method offers the same advantages as the device according to the invention.

In an embodiment, the artificial grass strand parts are inserted in the ground folded in half, wherein an insertion depth is 15-20 cm and a length (L1) of the artificial grass tufts above the ground is 1-4 cm.

In an embodiment:
the device is moved to a location on the ground and the device is then stopped,
a series of artificial grass strand parts which is held by two clamps is cut, and
by rotation of the drum, the artificial grass strand parts are positioned in the insertion position below the insertion device, and
the drum is then stopped, and
the insertion device then inserts the artificial grass strands in the ground by inserting the insertion pins in the ground, wherein the artificial grass strand parts are carried by the insertion pins.

In an embodiment, the clamps are first brought to a loose state by means of a clamp actuator prior to insertion of the insertion pins, so that the series of artificial grass parts which is in the insertion position is no longer clamped by the clamps.

In an embodiment, the artificial grass strands are cut before they are positioned below the insertion device.

In an embodiment, the artificial grass strands are cut during the stationary period.

In an embodiment, the device comprises at least two drums, wherein a mutual distance L3 between the two drums can be set by means of adjustment means and in particular set to a distance of L3=N*L4+0.5*L4, wherein N is an integer and L4 is a cycle distance over which the device is moved forward each time.

In an embodiment, the drum rotates with the bottom part against the transport direction of the drum.

The invention is now explained in more detail below with reference to the figures. The same reference numerals refer to the same parts. The figures serve exclusively as examples.

DETAILED DESCRIPTION OF THE FIGURES

Figure 1:
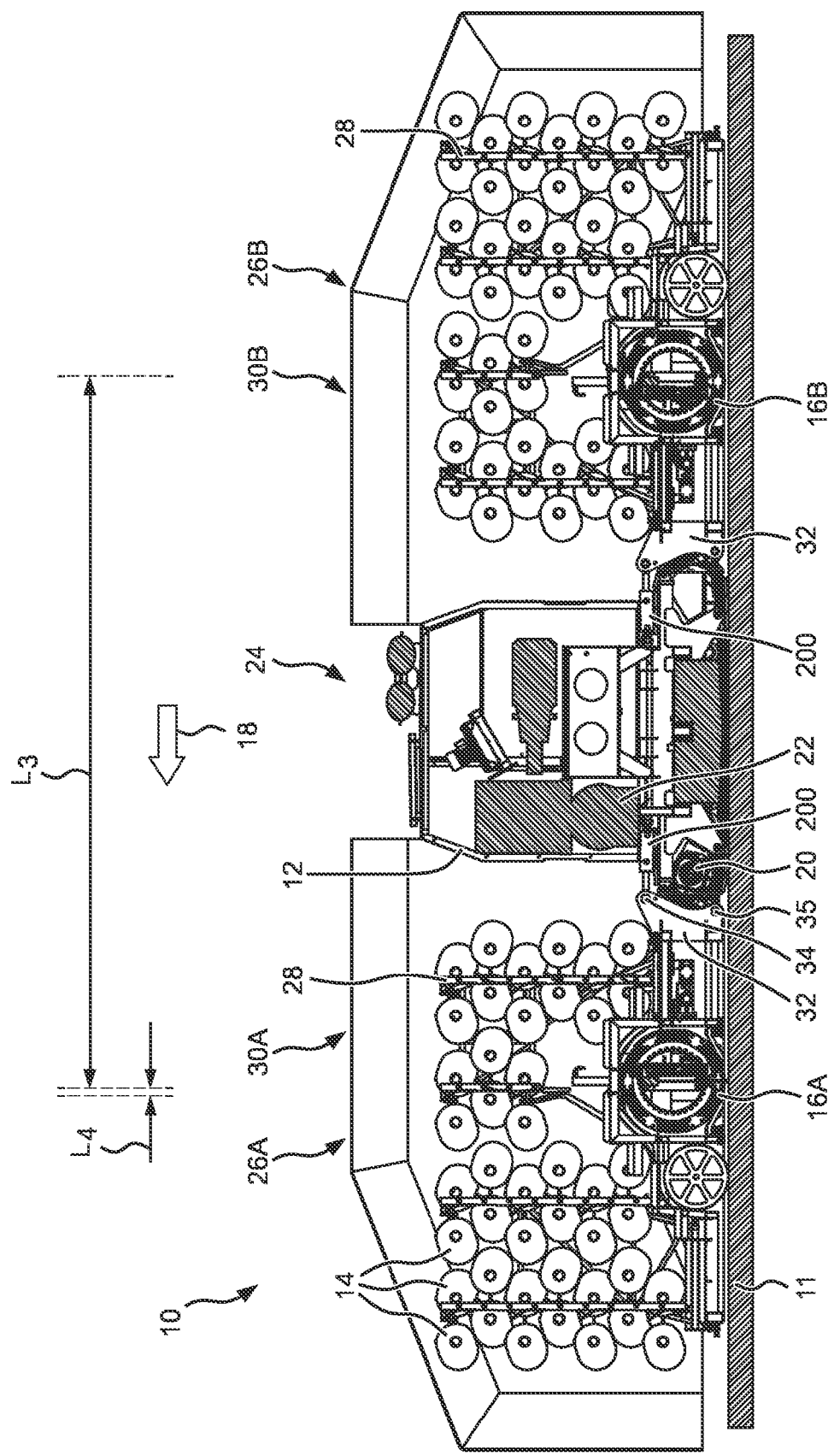
FIG. 1 shows a side view of an embodiment of the device according to the invention.

With reference to FIG. 1, the device 10 for inserting artificial grass strand parts in the ground comprises a frame 12 which is configured to support the various components of the device.

The device has tracks 20 and the drive 22 to be able to move the device over the ground 11. The device may also be provided with wheels or a skid element to achieve the same goal. The device may also be provided with a connector for attaching the device to the front or rear of another vehicle, for example a tractor. The device has a central driving part 24 which contains the tracks and the drive. The device has a front injection part 25A and a rear injection part 25B.

The device furthermore has a plurality of spools 14 with artificial grass strands wound thereon. The device may have more than 50 spools, in particular 70 to 100 spools. A larger or smaller number of spools is also possible.

The device comprises two drums 16 (indicated in FIG. 1 with reference numerals 16A, 16B) which are mounted in a rotating manner on the frame 12. The drums 16 rotate about respective, substantially horizontal rotation axes 51 (shafts) (see FIG. 4). The shafts are supported on two ends by the frame. The axes are perpendicular to the direction of movement as indicated by arrow 18. The drums are configured to receive a plurality of artificial grass strands which are unwound from the spools 14 and to rotate these artificial grass strands with the movement of the drum. The device has a front drum 16A and a rear drum 16B which are placed behind each other in order to be able to work with two drums simultaneously. The front drum 16A is placed in front of the central travelling part and the rear drum 16B is placed behind the central travelling part. The drums have a diameter between 60 cm and 150 cm.

The spools 14 are divided into two groups 26A, 26B, i.e. a front group 26A which is associated with the front drum 16A, and a rear group 26B which is associated with the rear drum 16B. The spools are mounted rotatably on stands 28 which are attached to the frame.

The front injection part 25A comprises the front drum 16A and the front group of spools 26A. These are mounted on a front frame part 30A which is mounted on the central travelling part 24 via connectors 32. Similarly, the rear injection part 25B comprises the rear drum 16B and the rear group of spools 26B mounted on a rear frame part 30B which is mounted on the central travelling part 24 via connectors 32. Both connectors have an upper fixing point 34 and a lower fixing point 35.

Figure 2:
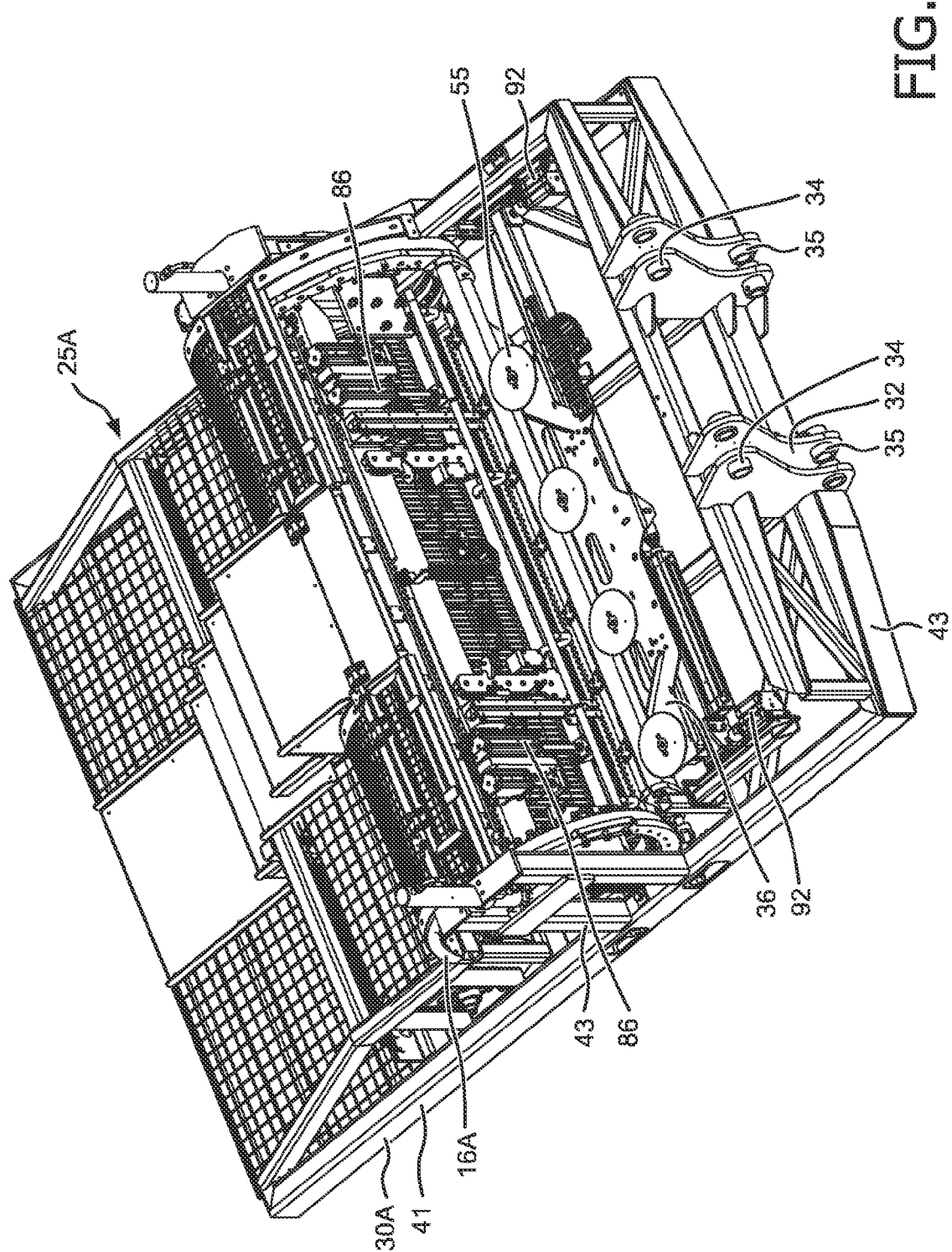
FIG. 2 shows an isometric view of an embodiment of an injection part of the device according to the invention.
Figure 3:
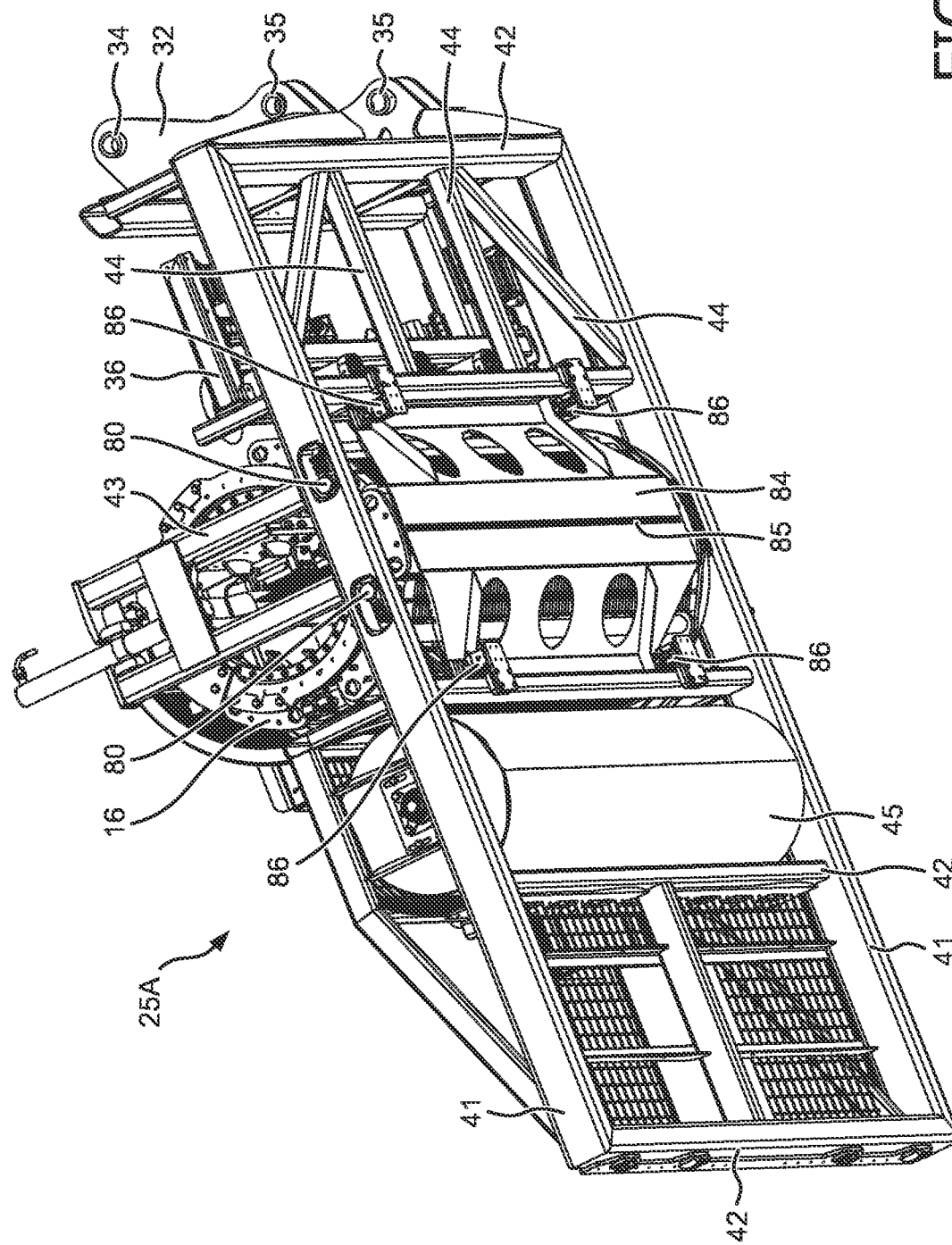
FIG. 3 shows a view obliquely from below of an injection part of an embodiment of the device according to the invention.

With reference to FIGS. 2 and 3, the function of the injection part 25A will be explained in more detail. The front frame part 30A comprises longitudinal members 41, cross members 42 and an upwardly extending part 43 which supports the drum 16A. The frame part 30A comprises further reinforcing members 44. The stands 28 and the spools 14 are not shown in these figures. The injection part 25A comprises a cutting device 36A which is positioned near the drum 16 and the function of which will be explained later.

The injection part furthermore comprises a roller 45. This roller supports the frame.

Figure 4:
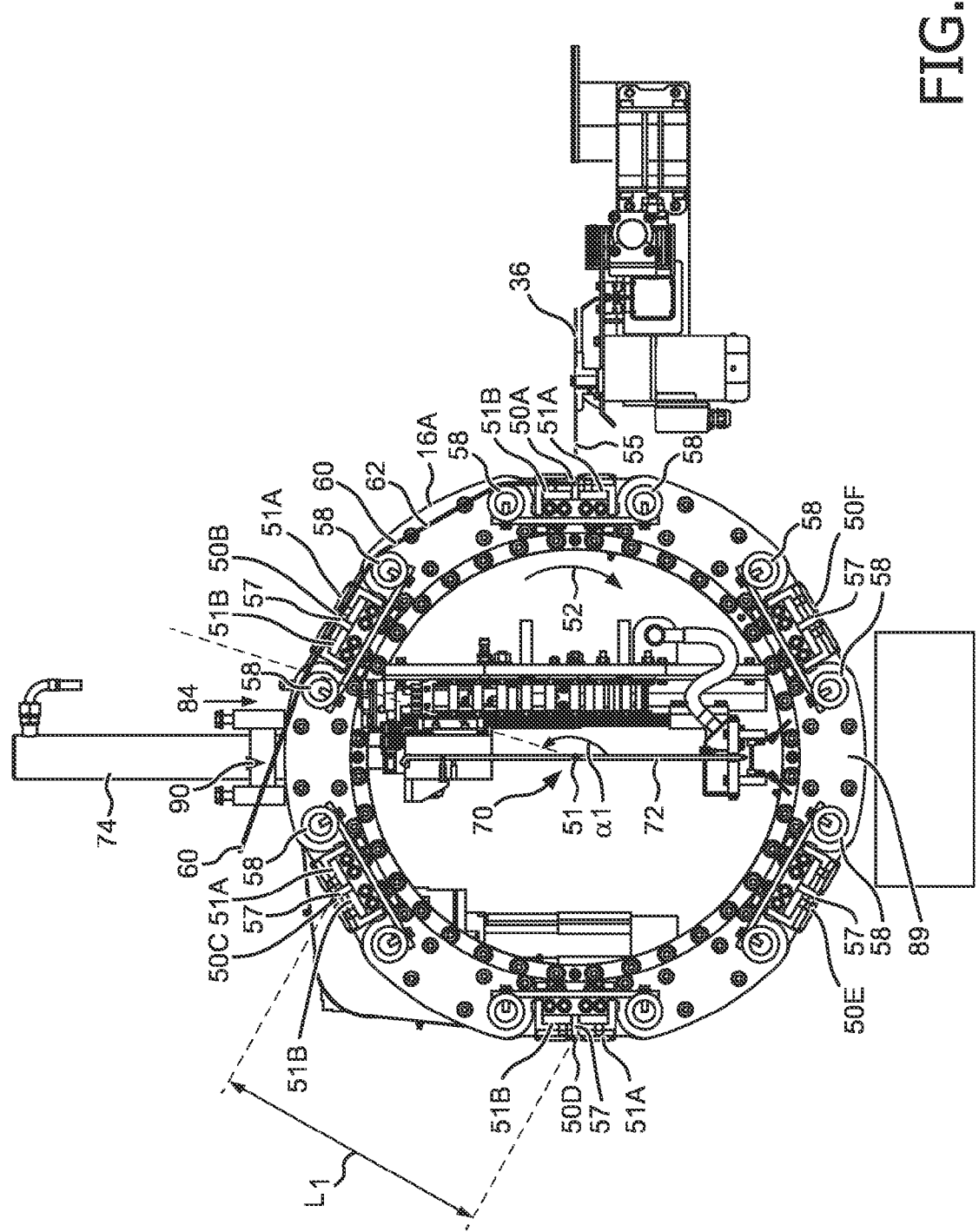
FIG. 4 shows a side view of an embodiment of the drum and the cutting device.
Figure 5:
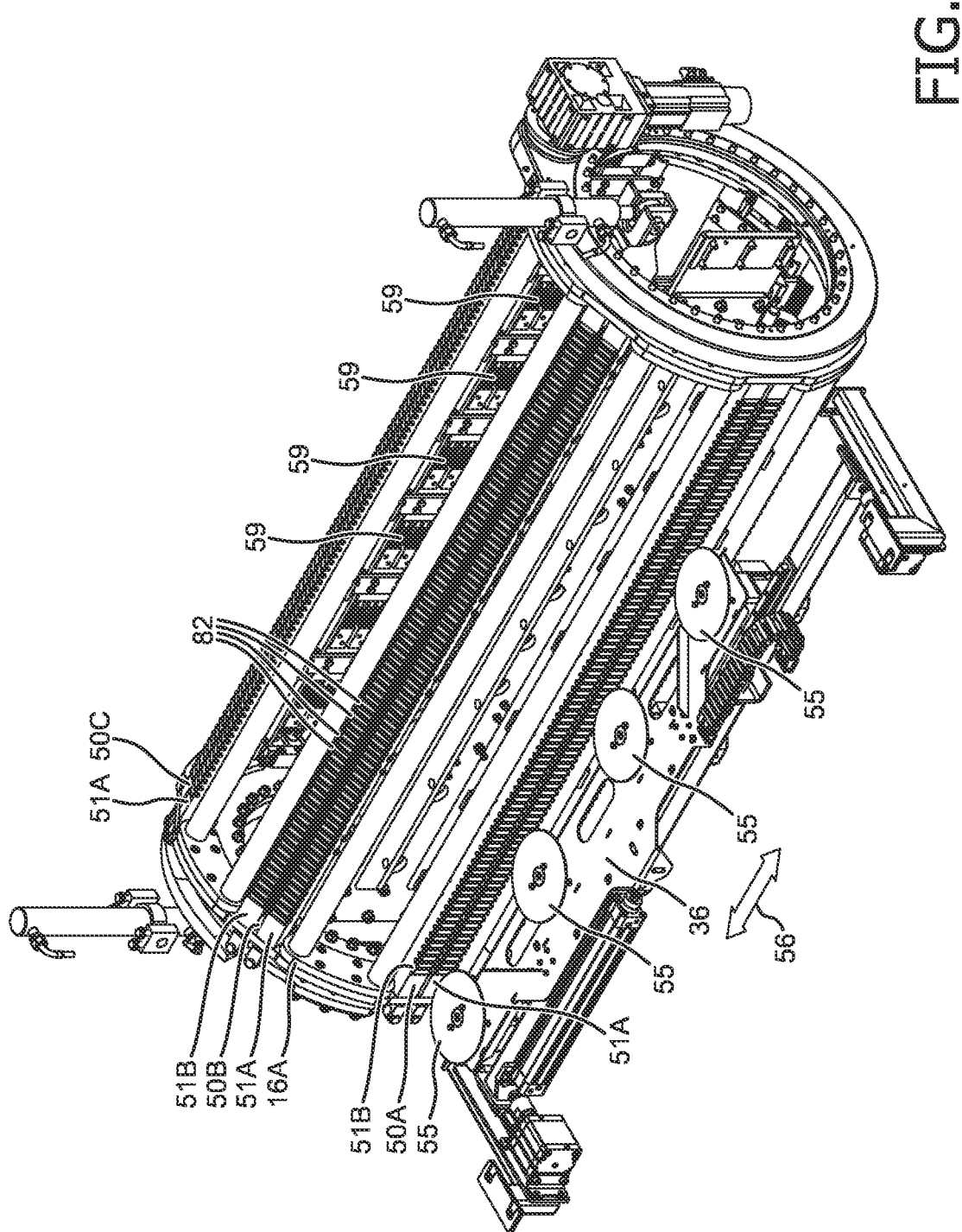
FIG. 5 shows an isometric view of an embodiment of the drum and the cutting device.
Figure 6:
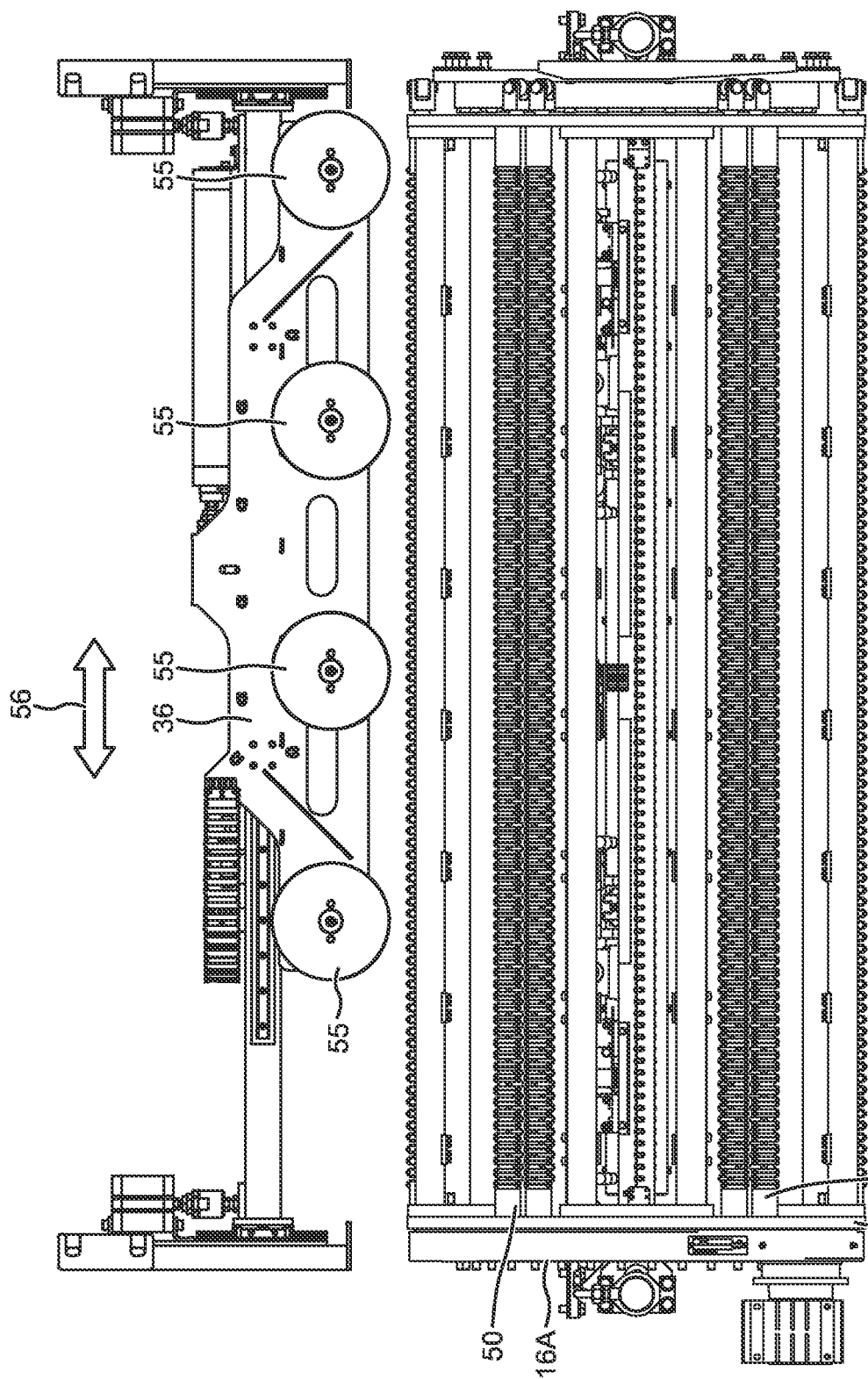
FIG. 6 shows a top view of an embodiment of the drum and the cutting device.

With reference to FIG. 4 in connection with FIGS. 5 and 6, the drum 16A comprises a plurality of clamps 50A, 50B, 50C, 50E, 50D and 50F. In total there are six clamps on each drum 16. The clamps are generally indicated with reference numeral 50. The drum may also have a different number of clamps, for example 4, 5, 7 or 8 clamps.

Viewed from the side, the clamps are arranged around the rotation axis 51. The clamps rotate with the drum in the direction of arrow 52. The clamps 50 are placed at mutual intervals L1 of 30-50 cm, in particular 35-45 cm apart, more particularly at a distance of 38-42 cm apart. The distance L1 determines the length of the cut artificial grass strand parts 62. The length of the artificial grass strand part 62 is still greater than L1, because the guides 58 ensure that the path followed by the artificial grass strand part is not a straight line between two clamps but is formed by three parts:
1) a part 88A between the rear shoe 51B, which holds the front end of the artificial grass strand part 62, and the guide 58 located behind this,
2) a part 88B between two guides 58, and
3) a part 88C between a front shoe 51A, which holds the rear end of an artificial grass strand part 62, and the guide 58 located in front of this.

Figure 8:
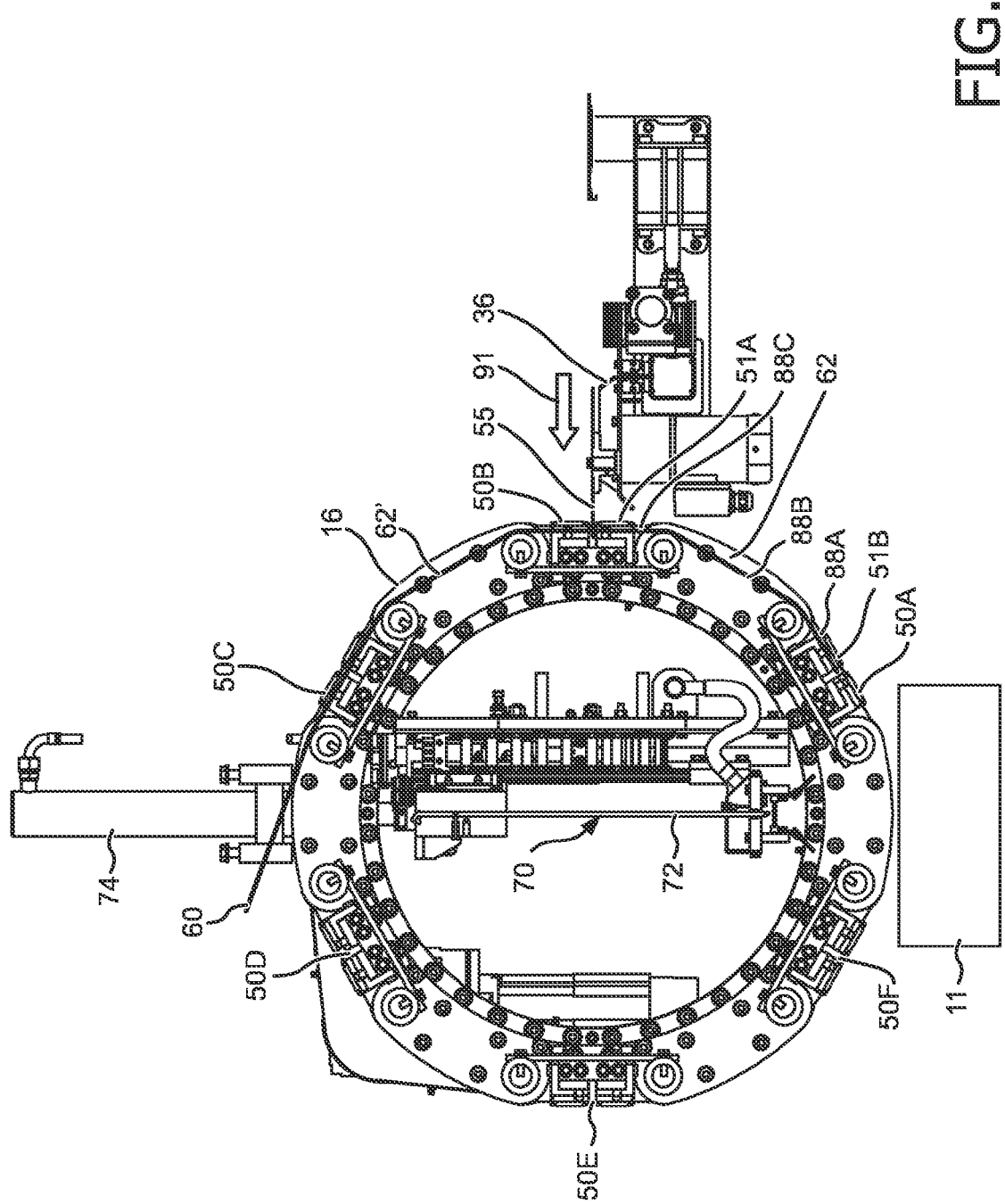

The parts 88A, 88B, 88C are shown in FIG. 8.

For each artificial grass strand 60, the clamps hold an artificial grass strand part 62 clamped between a front clamp (in FIG. 4, this is clamp 50A) and a rear clamp (in FIG. 5, this is clamp 50B), viewed in the direction of rotation, and allow the artificial grass strand parts to rotate with the drum.

The injection part 30A furthermore comprises a feed device for feeding the series of artificial grass strands from the spools to the drum. The feed device cannot be seen in FIGS. 4, 5 and 6.

The injection part 30A furthermore comprises a cutting device 36 for cutting the artificial grass strands, so that the clamped artificial grass strand parts 62 are cut loose from the rest of the respective artificial grass strand 60. The cutting device 36 has four rotating driven knives 55 which move to and fro in the direction of arrow 56 during rotation.

The injection part 30A furthermore comprises an insertion device 70 which comprises a plurality of insertion pins 72 and at least one actuator 74, wherein the actuator 74 inserts the insertion pins 72 into the ground over a certain depth. The drum 16A is configured to rotate the series of artificial grass strand parts 62 to below the insertion device 70. By the rotation of the drum, the front clamp 50A—viewed in the direction of rotation—is moved underneath the insertion device. The insertion device 70 is configured to press the artificial grass strand parts 62, which are rotated to below the insertion device, into the ground. The insertion pins 72 of the insertion device 70 make contact at the underside of the drum with the artificial grass strand parts to be inserted. The insertion pins 72 are located in the drum and the drum 16A rotates around the insertion pins. The actuator 74 is outside the drum.

The insertion pins 72 may be provided with an inverted V-shape at their bottom end, in order to be able to grip the artificial grass strand parts firmly.

In side view, the drum is configured to tension at least two cut artificial grass strand parts 62 behind each other and bring these successively below the insertion device.

Strand guides 58 are positioned between the clamps 50. The strand guides 58 are mounted on the drum and rotate with the drum.

The cutting device 36 is mounted stationarily on the frame and is configured to cut the series of artificial grass strands.

The drum inlet 90, where the artificial grass strands are fed into the drum, is located at the top half of the drum, more particularly at an angle ca of 120-270 degrees from the lowest point 89 of the drum. In FIG. 5, it can be seen that α1 is around 175 degrees.

In the device, the artificial grass strands 60 are moved through the device in a row next to each other. Each clamp 50 is configured to clamp firmly at least 50 artificial grass strands, and for this has at least as many clamping shoes 82. Each clamp 50 may be configured to clamp at least 80 artificial grass strands. This is shown clearly in FIG. 5. The clamping shoes 82 define grooves in which the artificial grass strands are placed. The artificial grass strands 60 and also the cut parts 62 are stationary relative to the drum during rotation of the drum.

Each clamp defines at least 50 parallel tracks, and In an embodiment even at least 80 parallel tracks 83. The tracks lie next to each other and are separated from each other, wherein an artificial grass strand is fed into each track and wherein the clamp has a clamping shoe 82 for each track, for clamping the artificial grass strand in the track.

Each clamp 50 comprises a front shoe 51A and a rear shoe 51B, in particular a front shoe 51A and a rear shoe 51B for each of the at least fifty clamping shoes 82, wherein a gap 57 is defined between the front shoes 51A and the rear shoes 51B. The knives 55 of the cutting device are configured to make a cut through the artificial grass strands in the gap 57, so that the front shoe 51A holds a rear end of the cut artificial grass strand part 62 and the rear shoe holds a front end of the artificial grass strand 60.

The clamps 50 are pre-tensioned by at least one spring force element 59. The clamps are connected together by a bar so that all clamps are activated and deactivated simultaneously. The artificial grass strands 60 are automatically clamped when placed in the clamp, without any further action being required. Each injection part of the device 10 has two clamp actuators 80 which deactivate the clamps 50, which hold the artificial grass strand parts 62 to be inserted, prior to insertion of the artificial grass strand parts by the insertion device.

The clamp actuators 80 are arranged stationarily and are mounted on the frame, in particular next to the drum. It is however also possible to mount the clamp actuators 80 on the drum and allow them to rotate with the drum. In this case, for each clamp 50, a clamp deactivation device 80 is provided. The clamp actuators 80 are essentially deactivating actuators, i.e. they release the clamps 50 which are pre-tensioned by the spring device 59, against the force of the pretension by the spring device 59. The clamp actuators 80 are preferably hydraulic.

With reference to FIG. 3, for each injection part the device has a presser element 84 and one or more presser actuators 86 (see also FIG. 2). The artificial grass strands are guided below the presser element 84. The presser element 84 has a series of continuous holes 85. Through these the insertion pins 72 are pressed into the ground. It is also possible that a number of through holes 85 are joined together into slots.

The artificial grass strand parts can slide relative to the presser element. Each continuous hole 85 for an insertion pin opens at an artificial grass strand part during operation.

The underside of the drum is at a distance of 5-30 cm, in particular at a distance of 10-20 cm, above the ground.

The cutting device is situated at a distance L2 from the insertion device 70 which is greater than the distance L1 between two successive clamps, so that the artificial grass strands are cut through before they are positioned below the insertion device. L2 is here measured along the path which is defined by the clamps 50 and the guides 58.

OPERATION OF THE DEVICE

With reference to FIGS. 4, 7, 8, 9 and 10, the operation of the device 1 according to the invention is explained in more detail. The figures show only one artificial grass strand 60 because the figures are side views, but the person skilled in the art will understand that this represents a series of artificial grass strands 60.

During operation, the method for inserting artificial grass strand parts in the ground 11 comprises the following steps. The device 10 is moved over the ground 11 to a location and the device is stopped at this location.

A series of artificial grass strands 60 is fed into the drum and clamped by a front clamp 50A. The drum rotates through a cycle angle β of 60 degrees to a next position, in which movement the front clamp 50A draws the series of artificial grass strands off the spools. The front clamp 50A is in front of the cutting device 36. A following clamp 50B grips the series of artificial grass strands. This is the situation shown in FIG. 4.

Figure 7:
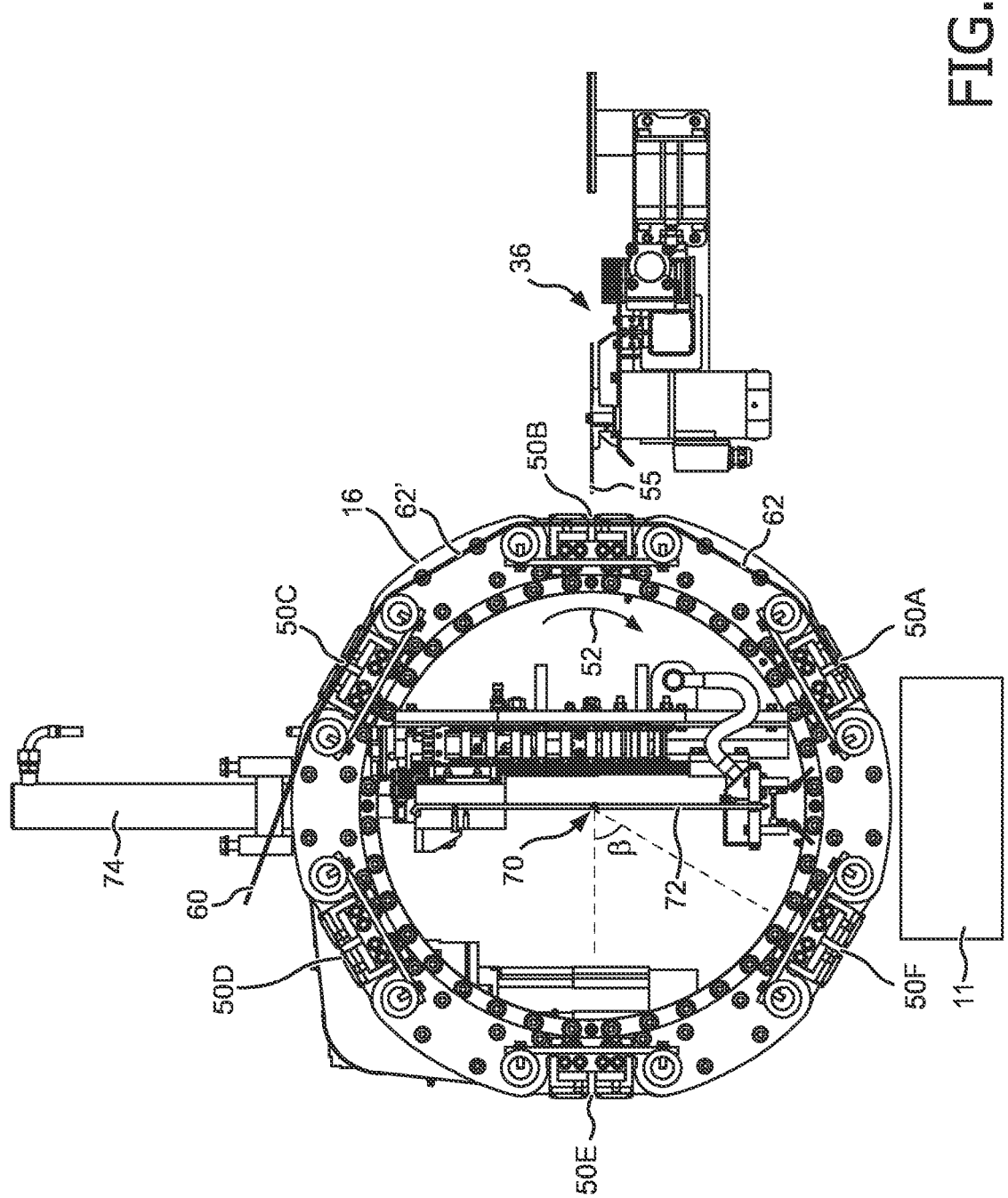
FIGS. 7, 8, 9 and 10 show side views of an embodiment of the drum in the various stages during the method according to the invention.

With reference to FIG. 7, the drum 16 then rotates again through a cycle angle of 60° to a next position. The clamp 50A is now obliquely below the insertion device 70. The clamp 50B is in front of the cutting device. A following clamp 50C grips the artificial grass strands 60 and holds them firmly. Now a second series of artificial grass strands 62' is clamped.

With reference to FIG. 8, the rotating knives 55 are moved in the direction of arrow 91 into the gap between the front shoe 51A and the rear shoe 51B of clamp 50B. This takes place by actuators 92 (which are indicated in FIG. 2). The knives 55 then cut through all artificial grass strands by moving forward and back along arrow 56 (see FIG. 5) during rotation. The artificial grass strand parts 62 are now separate from the rest of the artificial grass strands 60 and are held by the rear shoe 51B of clamp 50A and the front shoe 51A of clamp 50B.

Figure 9:
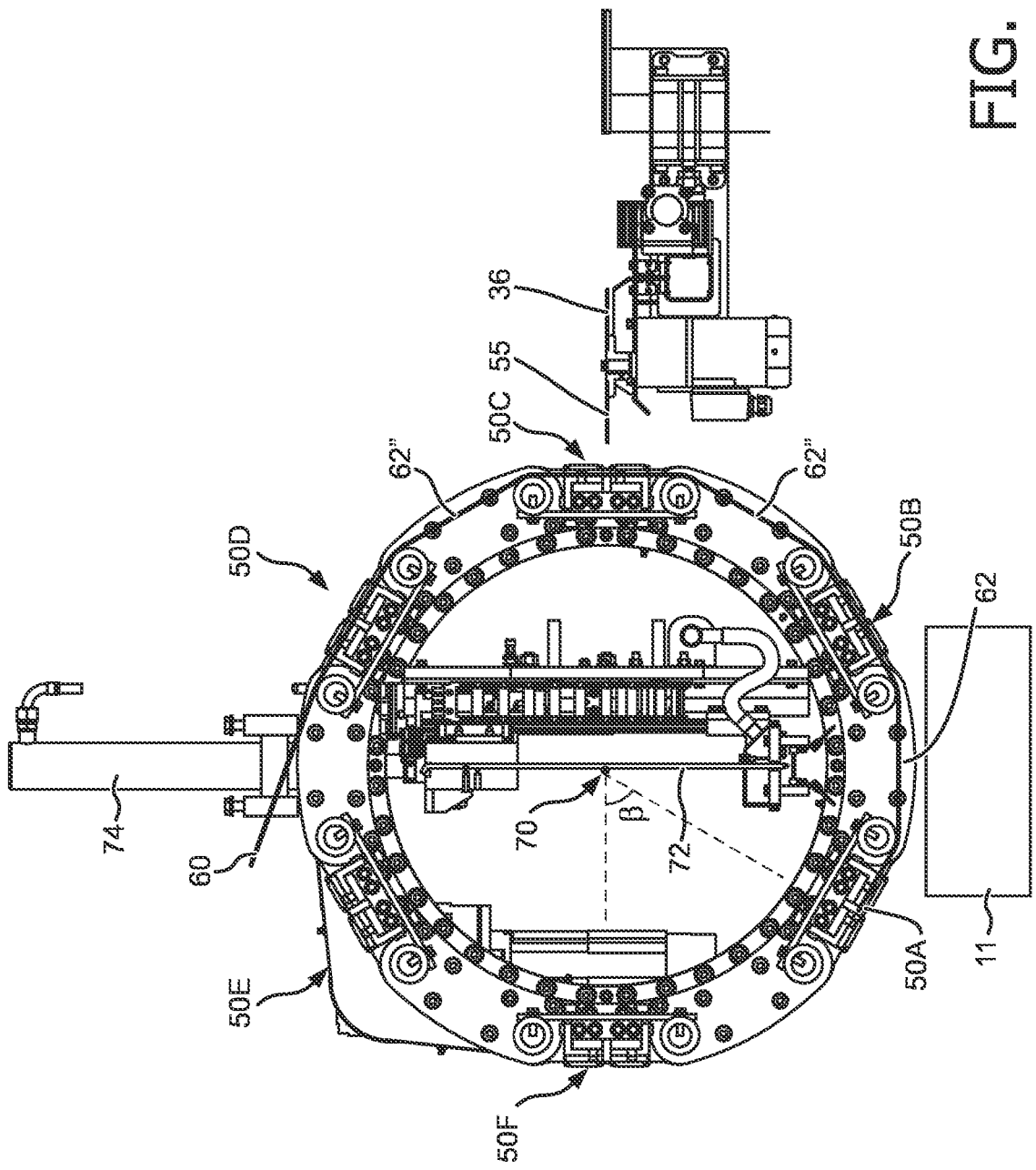

With reference to FIG. 9, then by means of the drum 16A the series of artificial grass strand parts 62 is rotated below the insertion device 70, wherein the series of artificial grass strand parts 62 is clamped between a front clamp 50A and a rear clamp 50B, viewed in side view and in relation to the rotation direction of the drum.

Again a next clamp 50D grips the series of artificial grass strands 60 and holds it firmly. Now a third series of artificial grass strands 62" is clamped.

Then the drum is stopped. The presser element 84 (see FIG. 3) is then pressed against the ground so that the artificial grass strand parts cannot shift sideways. The artificial grass strand parts 62 can however shift in their length direction relative to the presser device.

Next the two clamps 50A, 50B, which hold the series of artificial grass strand parts 62 below the insertion device 70, are released by means of the two clamp actuators 80 (see FIG. 3), so that the series of artificial grass strand parts in the insertion position is no longer clamped by the clamps.

Figure 10:
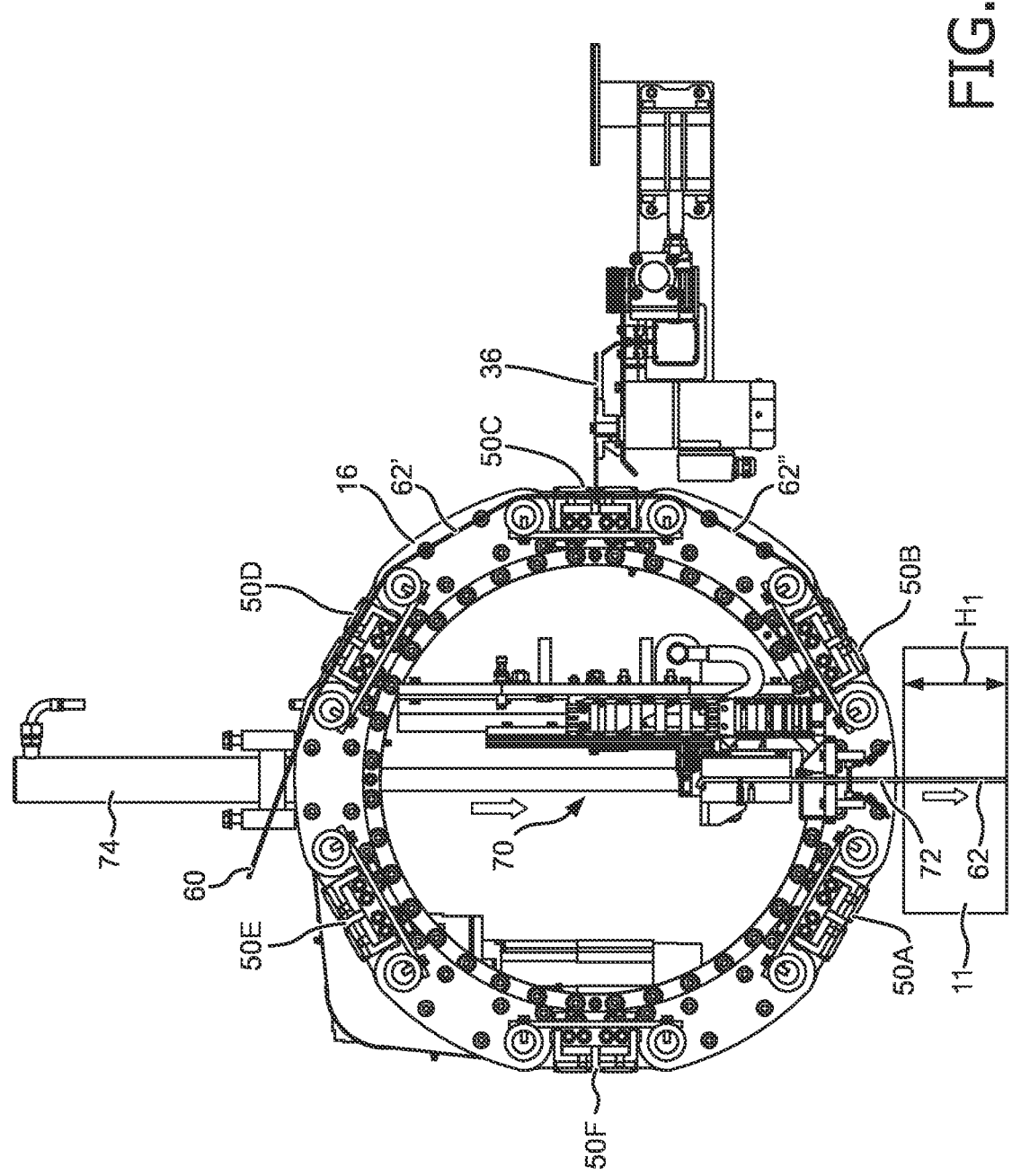

With reference to FIG. 10, the insertion device 70 is then activated and the insertion pins 72 are pressed into the ground. Each insertion pin carries with it an artificial grass strand part 62. The artificial grass strand parts 62 are folded in half during insertion, with a U bend at the bottom end.

Then the insertion pins 72 are raised again by the actuator 74. During insertion, a new series of artificial grass strand parts 62' is also cut off by the knives 55 of the cutter device. The new series of artificial grass strand parts 62' is thus ready to be pressed into the ground in the next cycle.

Then a new cycle may be started. The steps from FIGS. 9 and 10 are now repeated. The device 10 is moved over a cycle distance L4 (see FIG. 1) to a following position on the hybrid grass surface to be created, and stopped there. The cycle distance L4 over which the device is moved is of the order of 2-6 cm, i.e. relatively small. Other distances may also be chosen.

The mutual spacing L3 (see FIG. 1) between the two drums 16A, 16B can be set by means of actuators 200 or other adjustment means. In practice, it has proved useful to allow the front and rear drum to insert strands out of phase. Here the rear drum 16B inserts its strands in the middle between two successive rows inserted by the front drum 16A. In other words, the front drum for example inserts strands every 4 cm, and the rear drum inserts precisely in-between so that the overall insertion gap is 2 cm. The distance L3 is then set according to the formula L3=N*L4+0.5*L4. N is here an integer. In this way work can proceed continuously.

In existing machines, the distance L3 is fixed and is a multiple of the cycle distance L4, whereby it is difficult or impossible to work continuously. In this way, for continuous working, the rear drum would insert strands at precisely the same point as the front drum. This is prevented by only allowing the machine to rotate over a distance L3, and then to advance the machine without insertion over a distance L3. Then it may again insert strands after a distance L3. This pattern may be repeated. It is however an awkward way of inserting strands.

The drum 16 is rotated through a cycle angle to a following position. The rotation of the drum and the travelling to a new position may take place simultaneously for faster working. The series of artificial grass strand parts is positioned in the insertion position below the insertion device by the rotation of the drum. A new series of artificial grass strand parts is clamped.

The drum is stopped again. A series of artificial grass strand parts is inserted and a following series is cut off. In this way an entire hybrid grass surface can be created in a reliable and very rapid manner.

The artificial grass strand parts 62 are typically inserted in the ground over a distance of 18 cm and protrude 2 cm above the ground. Because the artificial grass strand parts 62 are folded in half, the total length required for each artificial grass strand part is 40 cm. Thus the mutual spacing, measured along the path followed by the artificial grass strands, between the clamps 50A, 50B, 50C, 50D, 50E and 50F is 30-50 cm, in particular 35-45 cm, more particularly 38-42 cm.

The insertion depth H1 may to some extent be varied, i.e. may amount to 15-20 cm, and a length (L1) of the artificial grass tufts above the ground may be between 1-4 cm.

During operation, the device performs a cycle, wherein the cycle comprises a rotation period and stationary period wherein:

in the rotation period, the drum is rotated through a cycle angle (β), wherein a series of artificial grass strand parts is positioned below the insertion device and a new series of artificial grass strand parts is clamped, and in the stationary period, the front series of artificial grass strand parts is released by the clamps and inserted in the ground by the insertion device, while a new series of artificial grass strand parts is cut away from the artificial grass strands.

In the same movement of the drum, a series of artificial grass strand parts 62 which is held between two successive clamps is rotated to below the insertion device 70, and also a new series of artificial grass strand parts 62" is clamped between two clamps.

During operation, the clamps 50 perform a rotating movement around the insertion device. The clamps do not perform any reciprocating movement as in the machine according to the prior art.

The artificial grass strands are cut before they are positioned below the insertion device. This too is different from the prior art, where the artificial grass strand parts are first brought below the insertion device and only then cut through.

The rear drum 16B rotates with the bottom part against the transport direction of the device 10. The front drum 16A rotates with the bottom part with the transport direction 18 of the device 10.

The device may have a cycle time of less than 8 seconds, in particular less than 6 seconds.

The clamps define at least 50 parallel tracks, in particular more than 70 parallel tracks, even more particularly more than 80 parallel tracks, and the same number of pins. The tracks are separate from each other. This is different from the machine according to EP1384817 where a drum defines a helical pattern. In EP1384817, the strand must first be arranged over the entire helix, which takes a long time. In the present invention, at least 50 strands can be arranged in the tracks simultaneously.

The artificial grass strands 60 usually comprise several fibers, in particular 5 to 8 fibers, more particularly 5 to 6 fibers.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average expert.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A device for inserting artificial grass strand parts in the ground, the device comprising:
    a frame, which is configured to support the various parts of the device;
    a plurality of spools with artificial grass strands wound thereon;
    at least one drum, which is mounted rotatably on the frame and rotates about a substantially horizontal rotation axis, wherein the drum is configured to receive a plurality of artificial grass strands which are unwound from the spools and to rotate these artificial grass strands with the movement of the drum, wherein the drum comprises a plurality of clamps which, viewed in side view, are arranged around the rotation axis, wherein the clamps rotate with the drum, wherein the clamps are configured to hold an artificial grass strand part of each artificial grass strand clamped between a front clamp and a rear clamp, viewed in the direction of rotation, and to allow the artificial grass strand parts to rotate with the drum;
    at least one cutting device for cutting through the artificial grass strands, so that the clamped artificial grass strand parts are cut off from the rest of the respective artificial grass strands; and
    at least one insertion device, which comprises a plurality of insertion pins and at least one actuator, wherein the actuator inserts the insertion pins into the ground over a depth;
    wherein the drum is configured to rotate the series of artificial grass strand parts to below the insertion device, wherein the insertion device is configured to insert the artificial grass strand parts which have been rotated to below the insertion device into the ground.

2. The device according to claim 1, wherein during operation, the device performs
    a cycle, wherein the cycle comprises a rotation period and a stationary period, wherein:
    in the rotation period, the drum is rotated over a cycle angle (β), wherein a series of artificial grass strand parts is positioned below the insertion device and a new series of artificial grass strand parts is clamped; and
    in the stationary period, the front series of artificial grass strand parts is released by the clamps and inserted in the ground by the insertion device.

3. The device according to claim 1, wherein viewed in side view, the drum has 4, 5, 6, 7 or 8 clamps.

4. The device according to claim 1, wherein when viewed in side view and measured along the path which is defined by the clamps and any guides, the clamps are placed at mutual intervals of 30 to 50 cm apart, 35-45 cm apart, or 38-42 cm apart.

5. The device according to claim 1, wherein the insertion pins are located in the drum.

6. The device according to claim 1, wherein the drum is configured to keep a stock of at least one series of cut artificial grass strand parts.

7. The device according to claim 1, wherein each clamp is configured to hold at least 50 artificial grass strands, and for this the clamp has at least the same number of clamp shoes.

8. The device according to claim 1, wherein each clamp comprises a series of front shoes and a series of rear shoes, in particular one front shoe and one rear shoe for each of the at least fifty tracks, wherein a gap is defined between the front shoes and the rear shoes, wherein the cutting device is configured to make a cut through the artificial grass strands in the gap so that the front shoes hold the rear ends of the cut artificial grass strand parts and the rear shoes hold the front ends of the artificial grass strands.

9. The device according to claim 1, wherein the clamps are pre-tensioned by means of a spring force element, wherein the artificial grass strands are automatically clamped when placed in the clamp without further action being required for this, and wherein the device comprises a clamp actuator which deactivates the two clamps, which hold the artificial grass strand part to be inserted below the insertion device, prior to insertion of the artificial grass strand parts by the insertion device.

10. A method for inserting artificial grass strand parts in a ground, the method comprising:
    providing a device according to claim 1,
    moving the device forward over the ground to a location and stopping the device at this location,
    bringing a series of artificial grass strand parts (62) to below the insertion device (70) by rotation of the drum (16A, 16B), wherein the series of artificial grass strand parts is clamped between a front clamp (50A) and a rear clamp (50B), viewed in side view and in relation to the rotation direction of the drum,
    stopping the drum, and
    inserting the artificial grass strand parts in the ground by the insertion device.

11. The method according to claim 10, wherein when viewed in side view, the clamps are located at mutual distances of 30-50 cm, 35-45 cm apart, or 38-42 cm apart.

12. The method according to claim 10, wherein:
    the device is moved to a location on the ground and the device is then stopped,
    a series of artificial grass strand parts which is held by two clamps is cut, and
    by rotation of the drum, the artificial grass strand parts are positioned in the insertion position below the insertion device,
    the drum is then stopped, and
    the insertion device then inserts the artificial grass strands in the ground by inserting the insertion pins in the ground, wherein the artificial grass strand parts are carried by the insertion pins.

13. The method according to claim 10, wherein the device during operation performs a cycle, wherein the cycle comprises a rotation period and a stationary period, wherein:
    in the rotation period, the drum is rotated through a cycle angle, wherein a series of artificial grass strand parts is positioned below the insertion device and a new series of artificial grass strand parts is clamped, and
    in the stationary period, the front series of artificial grass strand parts is released by the clamps and inserted in the ground by the insertion device.

14. The method according to claim 10, wherein the clamps are first brought to a loose state by means of a clamp actuator prior to insertion of the insertion pins, so that the series of artificial grass parts which is in the insertion position is no longer clamped by the clamps.

15. The method according to claim 10, wherein the artificial grass strands are cut before they are positioned below the insertion device.

* * * * *